United States Patent
Bar Shalom et al.

(10) Patent No.: US 11,966,294 B2
(45) Date of Patent: Apr. 23, 2024

(54) JOURNAL BARRIER CONSISTENCY DETERMINATION

(71) Applicant: EMC IP Holding Company LLC, Hopkinton, MA (US)

(72) Inventors: Adi Bar Shalom, Haifa (IL); Ivan Rubin, Haifa (IL); Oren Ashkenazi, Haifa (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 110 days.

(21) Appl. No.: 17/308,166

(22) Filed: May 5, 2021

(65) Prior Publication Data

US 2022/0358018 A1 Nov. 10, 2022

(51) Int. Cl.
*G06F 11/14* (2006.01)

(52) U.S. Cl.
CPC ...... *G06F 11/1435* (2013.01); *G06F 11/1451* (2013.01); *G06F 11/1464* (2013.01); *G06F 11/1469* (2013.01)

(58) Field of Classification Search
CPC ............. G06F 11/1435; G06F 11/1451; G06F 11/1464; G06F 11/1469
USPC .................................................. 711/162, 161
See application file for complete search history.

(56) References Cited

U.S. PATENT DOCUMENTS

| | | |
|---|---|---|
| 5,381,539 A | 1/1995 | Yanai et al. |
| 5,551,003 A | 8/1996 | Mattson et al. |
| 5,764,880 A | 6/1998 | Gerdt et al. |
| 6,052,799 A | 4/2000 | Li et al. |
| 6,941,420 B2 | 9/2005 | Butterworth et al. |

(Continued)

FOREIGN PATENT DOCUMENTS

| | | |
|---|---|---|
| WO | PCT/US2019/024885 | 1/2020 |
| WO | PCT/US2019/024900 | 1/2020 |

(Continued)

OTHER PUBLICATIONS

Dell EMC, "Dell EMC VxRack FLEX," Dell EMC Product Overview, 2018, 5 pages.

(Continued)

*Primary Examiner* — David Yi
*Assistant Examiner* — Zubair Ahmed
(74) *Attorney, Agent, or Firm* — Ryan, Mason & Lewis, LLP

(57) ABSTRACT

In one embodiment, an apparatus comprises a source system comprising a processing device coupled to memory. The processing device is configured to obtain an IO operation corresponding to an address of the source system. The IO operation comprises first user data. The processing device is further configured to store metadata associated with the IO operation in a first journal barrier of a replication journal of the source system and to close the first journal barrier. The processing device is further configured to determine that the first user data associated with the IO operation is missing from the first journal barrier and to obtain second user data from the address. The processing device is further configured to identify an interval from the first journal barrier to a second journal barrier and to provide the first journal barrier and the interval to a destination system.

20 Claims, 5 Drawing Sheets

(56) References Cited

U.S. PATENT DOCUMENTS

| | | | |
|---|---|---|---|
| 8,843,676 | B2 | 9/2014 | Rajamanickam et al. |
| 9,372,751 | B2 | 6/2016 | McNutt |
| 9,514,014 | B2 | 12/2016 | Webman et al. |
| 9,892,045 | B1 | 2/2018 | Douglis et al. |
| 10,078,598 | B1 | 9/2018 | Wallace et al. |
| 10,331,561 | B1 | 6/2019 | Shilane et al. |
| 10,445,180 | B2 | 10/2019 | Butterworth et al. |
| 2002/0032835 | A1 | 3/2002 | Li et al. |
| 2006/0277378 | A1* | 12/2006 | Morishita ........... G06F 11/2071 711/162 |
| 2007/0033437 | A1* | 2/2007 | Kawamura ......... G06F 11/2074 714/E11.107 |
| 2008/0021853 | A1 | 1/2008 | Modha et al. |
| 2009/0077557 | A1* | 3/2009 | Ichikawa ............ G06F 11/3461 718/102 |
| 2009/0204761 | A1 | 8/2009 | Caprioli et al. |
| 2009/0276593 | A1 | 11/2009 | Jacobson et al. |
| 2013/0305002 | A1 | 11/2013 | Hallak et al. |
| 2014/0244935 | A1 | 8/2014 | Ezra et al. |
| 2014/0297734 | A1* | 10/2014 | Lacapra .................. H04L 67/06 709/203 |
| 2016/0103764 | A1 | 4/2016 | Banerjee et al. |
| 2017/0315728 | A1* | 11/2017 | Zheng ................... G06F 3/0604 |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0227845 | A1 | 7/2019 | Sridhar et al. |

FOREIGN PATENT DOCUMENTS

| | | |
|---|---|---|
| WO | 2020204880 A1 | 10/2020 |
| WO | 2020204882 A1 | 10/2020 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 13 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReViveI/O: Efficient Handling of I/O in Highly-Available Rollback-Recovery Servers," HPCA, 10.1109/2006. 1598129, pp. 200-211.

Wikipedia, "Raft (Computer Science)," https://en.wikipedia.org/wiki/Raft_(computer_science), Feb. 10, 2020, 4 pages.

Wikipedia, "Paxos (Computer Science)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

Dell Technologies, "Dell EMC PowerFlex: Secure Snapshots," Technical White Paper, Jul. 2020, 17 pages.

Dell Technologies, "Dell EMC PowerFlex: Protected Maintenance Mode," Technical White Paper, Jul. 2020, 20 pages.

Dell Technologies, "Dell EMC PowerFlex: Introduction to Replication," Technical White Paper, Jun. 2020, 34 pages.

Dell Technologies, "Dell EMC PowerFlex: Networking Best Practices and Design Considerations," Best Practices, Jun. 2020, 64 pages.

Dell EMC, "Getting To Know Dell EMC PowerFlex, " Version 3.5.x, Rev. 02, Jan. 2021, 66 pages.

U.S. Appl. No. 16/807,709 filed in the name of Avi Puder et al. on Mar. 3, 2020, and entitled "Management of Shared Resources in a Software-Defined Storage Environment."

U.S. Appl. No. 16/822,818 filed in the name of Itay Keller et al. on Mar. 18, 2020, and entitled "Storage System Implementing Snapshot Longevity Ranking for Efficient Management of Snapshots."

U.S. Appl. No. 16/822,848 filed in the name of Itay Keller et al. on Mar. 18, 2020, and entitled "Assignment of Longevity Ranking Values of Storage Volume Snapshots Based on Snapshot Policies."

U.S. Appl. No. 16/823,813 filed in the name of Itay Keller et al. on Mar. 19, 2020, and entitled "Managing Incompressible Data in a Compression-Enabled Log-Structured Array Storage System."

U.S. Appl. No. 16/830,469 filed in the name of Roi Tagar et al. on Mar. 26, 2020, and entitled "Storage Block Balancing Using Volume Part Migration."

U.S. Appl. No. 16/830,473 filed in the name of Yugal Peleg Lieblich et al. on Mar. 26, 2020, and entitled "Replicated State Cluster with Standby Node State Assessment During Leadership Transition."

U.S. Appl. No. 16/830,946 filed in the name of Gil Ben Zeev et al. on Mar. 26, 2020, and entitled "Storage Volume Migration Scheduling Based on Storage Volume Priorities and Specified Constraints."

U.S. Appl. No. 16/832,763 filed in the name of Michal Yarimi et al. on Mar. 27, 2020, and entitled "Managing Storage Device Errors During Processing of Inflight Input/Output Requests."

U.S. Appl. No. 16/834,363 filed in the name of Itay Keller et al. on Mar. 30, 2020, and entitled "Managing Least Recently Used Cache Using Reduced Memory Footprint Sequence Container."

U.S. Appl. No. 16/836,824 filed in the name of Itay Keller et al. on Mar. 31, 2020, and entitled "Management of vol. Snapshots in a Data Storage System."

U.S. Appl. No. 16/888,742 filed in the name of Rivka Matosevich et al. on May 31, 2020, and entitled "Balancing Resiliency and Performance by Selective Use of Degraded Writes and Spare Capacity in Storage Systems."

U.S. Appl. No. 16/918,654 filed in the name of Rivka Matosevich et al. on Jul. 1, 2020, and entitled "Sharing Memory Resources Between Asynchronous Replication Workloads."

U.S. Appl. No. 16/983,423 filed in the name of Dan Aharoni et al. on Aug. 3, 2020, and entitled "Deferred Reclamation of Invalidated Entries that are Associated with a Transaction Log in a Log-Structured Array."

U.S. Appl. No. 17/024,912 filed in the name of Anurag Sharma et al. on Sep. 18, 2020, and entitled "Automatic Discovery and Configuration of Server Nodes."

U.S. Appl. No. 17/065,754 filed in the name of Dan Aharoni et al. on Oct. 8, 2020, and entitled "Direct Response to IO Request in Storage System with Remote Replication."

U.S. Appl. No. 17/070,073 filed in the name of Dan Aharoni et al. on Oct. 14, 2020, and entitled "Direct Response to IO Request in Storage System Having an Intermediary Target Apparatus."

U.S. Appl. No. 17/070,288 filed in the name of Anurag Sharma et al. on Oct. 14, 2020, and entitled "Pipeline-Based System for Configuration Checking and Reporting Associated with an Information Processing System."

U.S. Appl. No. 17/071,407 filed in the name of John Moran et al. on Oct. 15, 2020, and entitled "Dynamic Remediation Actions in Response to Configuration Checks in an Information Processing System."

U.S. Appl. No. 17/077,105 filed in the name of Yosef Shatsky et al. on Oct. 22, 2020, and entitled "Volume Tiering in Storage Systems."

U.S. Appl. No. 17/106,988 filed in the name of Rivka Matosevich et al. on Nov. 30, 2020, and entitled "Managing Host Connectivity to a Data Storage System."

U.S. Appl. No. 17/123,525 filed in the name of Itay Keller et al. on Dec. 16, 2020, and entitled "Deferred Reclamation of Invalidated Entries Associated with Replication in a Log-Structured Array."

U.S. Appl. No. 17/145,646 filed in the name of Yosef Shatsky et al. on Jan. 11, 2021, and entitled "Redistribution of Processing Groups between Server Nodes Based on Hardware Resource Utilization."

(56) References Cited

OTHER PUBLICATIONS

U.S. Appl. No. 17/232,203 filed in the name of Roman Spiegelman on Apr. 16, 2021, and entitled "Object Synchronization of Server Nodes in a Network Computing Environment."
U.S. Appl. No. 17/236,256 filed in the name of Doron Tal et al. on Apr. 21, 2021, and entitled "Recovery from Partial Device Error in Data Storage System."
U.S. Appl. No. 17/306,601 filed in the name of Rivka Matosevich et al. on May 3, 2021, and entitled "Managing Replication Journal in a Distributed Replication System."

* cited by examiner

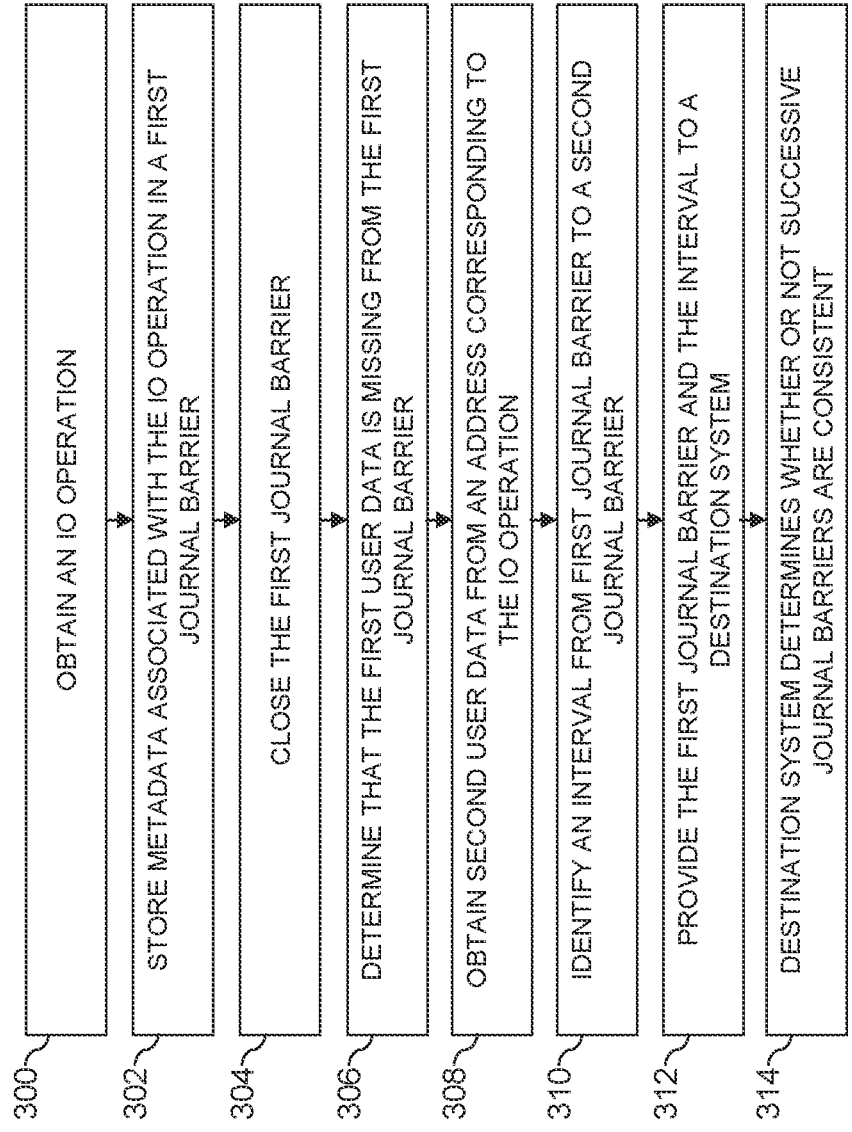

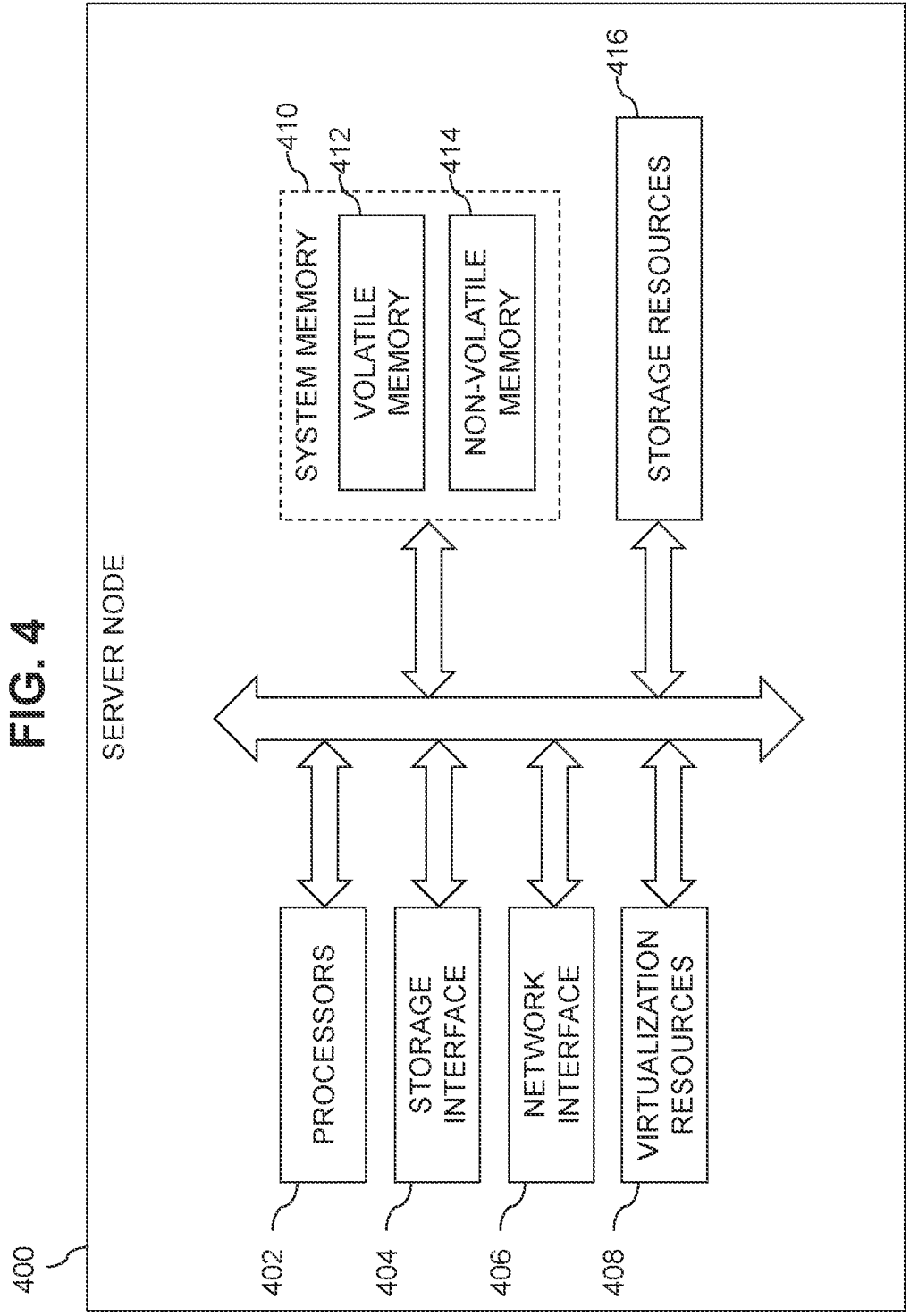

JOURNAL BARRIER CONSISTENCY DETERMINATION

TECHNICAL FIELD

This disclosure relates generally to data storage management in information processing systems and, more particularly, to data replication techniques for data storage systems.

BACKGROUND

Information processing systems typically implement data protection and disaster recovery techniques to protect against loss of critical system and application data. For example, data replication is one type of data protection technique that can be utilized to support disaster recovery. In general, data replication involves storing primary data (e.g., production data) at a primary site and storing a copy of the primary data at one or more remote sites to maintain one or more replicas of the primary data. There are two types of data replication techniques which depend on whether replication of the primary data is performed synchronously or asynchronously.

In particular, synchronous replication generally involves writing data to both a source (primary) volume and a destination (replica) volume before acknowledging completion of the input-output (IO) write operation to a host application. In this regard, synchronous replication is utilized for applications which require the primary data and the replica data to remain synchronized in real-time to provide high availability of critical systems or applications. In the event of a failure at the primary site, applications can failover to a remote site and resume operation with assurance of zero data loss. On the other hand, asynchronous replication generally involves writing data to the source volume, and acknowledging completion of the IO write operation to the host application before the data is replicated to the destination volume. With asynchronous replication, the IO write operations at the source site are logged in a replication journal, and the replication journal is periodically transmitted at scheduled times to a destination site which processes the replication journal to replicate the data to the destination volume.

SUMMARY

In one embodiment, an apparatus comprises a source system comprising at least one processing device coupled to memory. The at least one processing device is configured to obtain an IO operation corresponding to an address of the source system. The IO operation comprises first user data. The at least one processing device is further configured to store metadata associated with the IO operation in a first journal barrier of a replication journal of the source system and to close the first journal barrier. The at least one processing device is further configured to determine that the first user data associated with the IO operation is missing from the first journal barrier and to obtain second user data from the address. The at least one processing device is further configured to identify an interval from the first journal barrier to a second journal barrier and to provide the first journal barrier and the interval to a destination system.

Other embodiments of the disclosure include, without limitation, systems and articles of manufacture comprising processor-readable storage media, which are configured to manage utilization of shared memory resources among a plurality of asynchronous replication workloads.

BRIEF DESCRIPTION OF THE DRAWINGS

FIG. 3 illustrates an example process for handling journal barriers having changes with missing user data according to an exemplary embodiment of the disclosure.

FIG. 4 schematically illustrates a framework of a server node for implementing a storage node which hosts a data replication system according to an exemplary embodiment of the disclosure.

DETAILED DESCRIPTION

Exemplary embodiments will be described herein with reference to exemplary information processing systems which implement data storage systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1A:
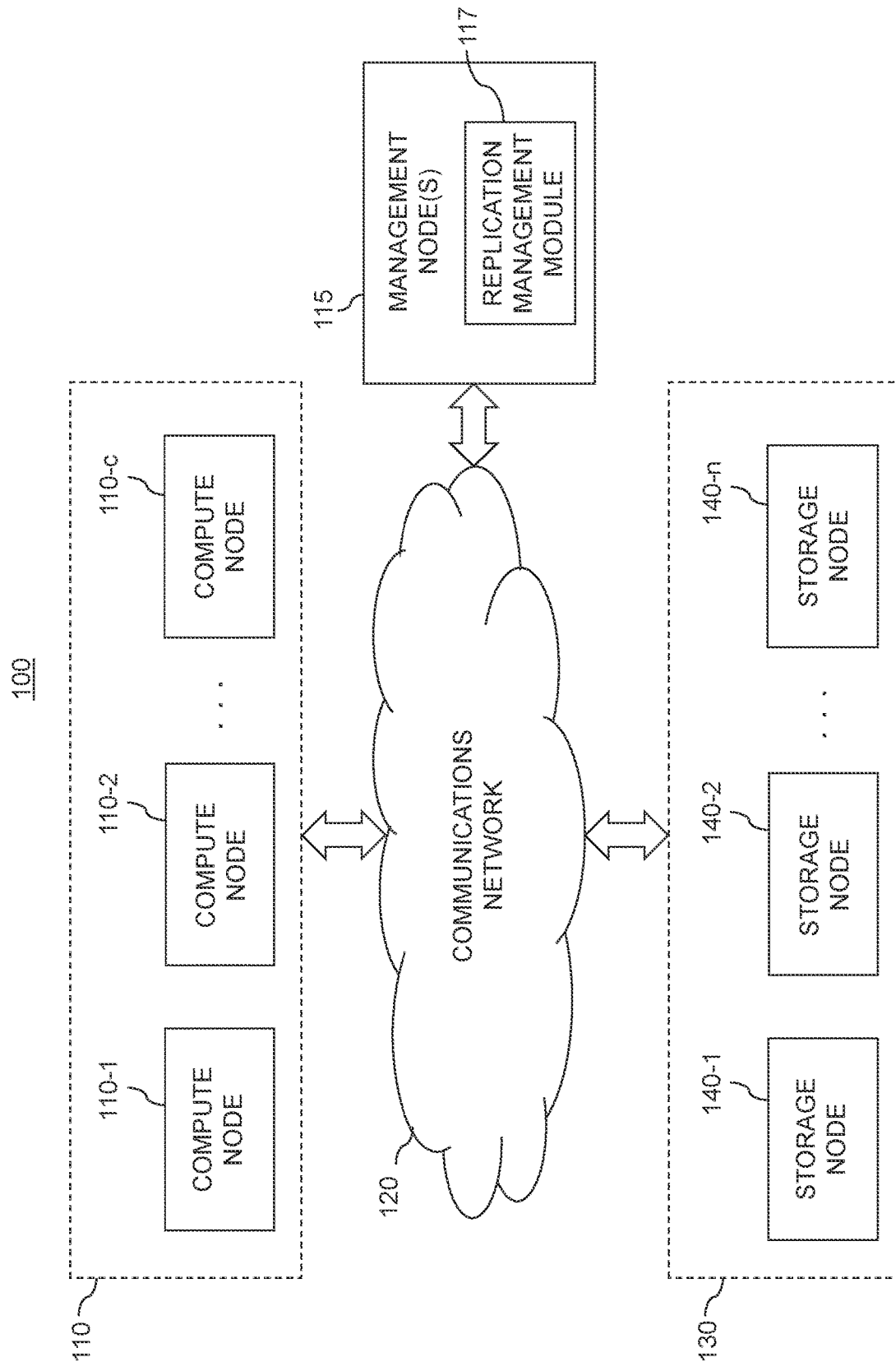
FIGS. 1A and 1B schematically illustrate an information processing system comprising a data replication system according to an exemplary embodiment of the disclosure.
Figure 1B:
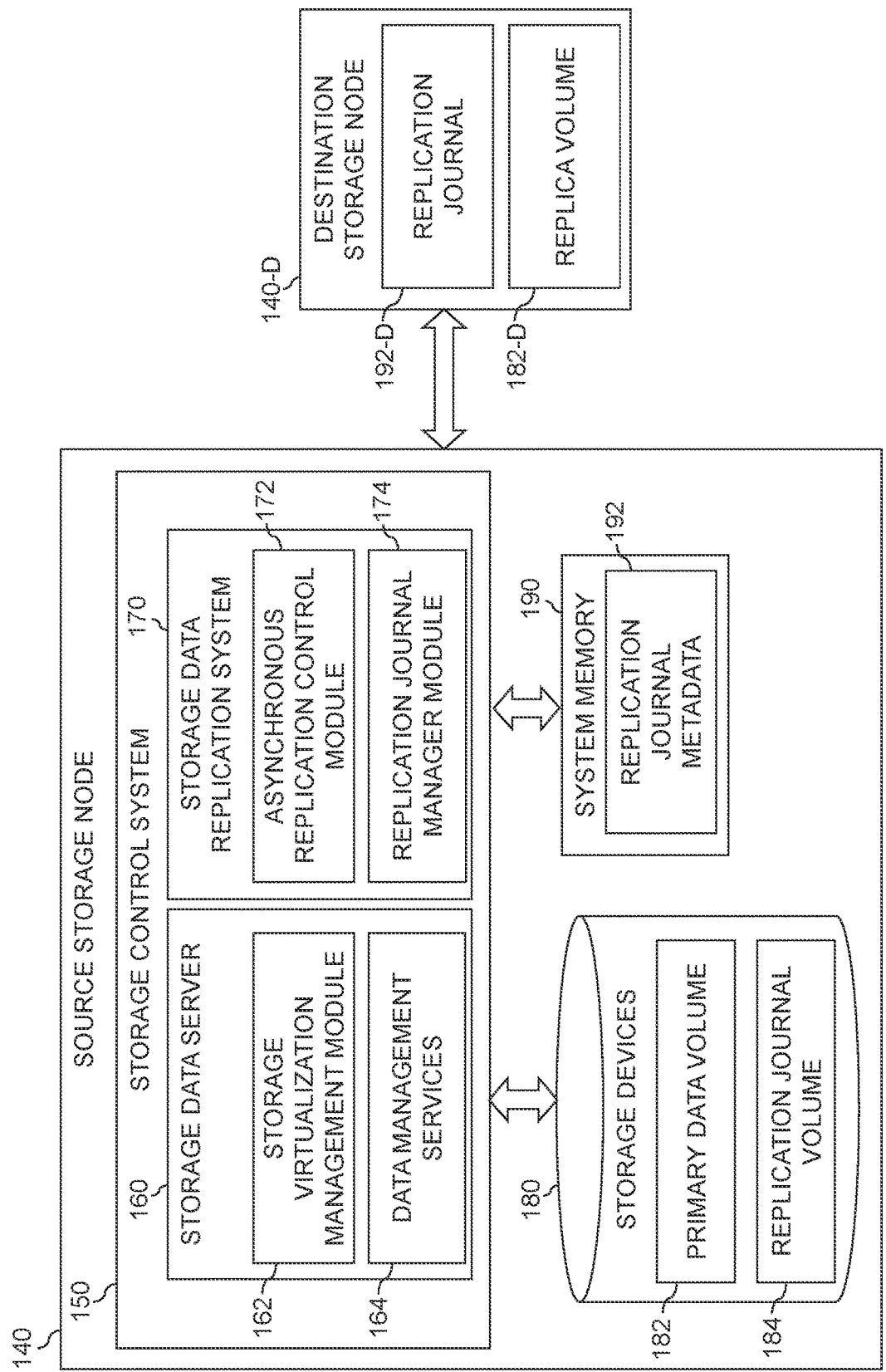

FIGS. 1A and 1B schematically illustrate an information processing system comprising a data replication system which is configured according to an exemplary embodiment of the disclosure. More specifically, FIG. 1A schematically illustrates an information processing system 100 which comprises a plurality of compute nodes 110-1, 110-2, . . . , 110-c (collectively referred to as compute nodes 110), one or more management nodes 115 (which implement a management layer of the system 100), a communications network 120, and a data storage system 130 (which implement a data storage layer of the system 100). The data storage system 130 comprises a plurality of storage nodes 140-1, 140-2, . . . , 140-n (collectively referred to as storage nodes 140, or each singularly referred to as storage node 140). In the context of exemplary embodiments as discussed in further detail below, the management nodes 115 implement a data replication management module 117 which implements methods to perform various management functions to control, e.g., asynchronous data replication operations that are performed by the storage nodes 140. FIG. 1B schematically illustrates an exemplary framework of some or all the storage nodes 140.

In particular, as shown in FIG. 1B, the storage node 140 comprises a storage control system 150 comprising a storage data server 160, a storage data replication system 170, local data storage devices 180, and system memory 190. The storage data server 160 comprises various modules including, but not limited to, a storage virtualization management module 162 and one or more modules to support data management services 164. The storage data replication system 170 comprises various modules including, but not limited to, an asynchronous replication control module 172, and a replication journal manager module 174, the functions of which will be explained in further detail below. In some embodiments, the storage control system 150 comprises a software-defined storage (SDS) system wherein, the storage data server 160 and the storage data replication system 170 are integrated software modules of the storage control system 150. In other embodiments, the storage data replication system 170 comprises a stand-alone software system that is separate from the storage control system 150 but configured to operate in conjunction with the storage control system 150. In some embodiments, a separate replication node comprises the storage data replication system 170 and is configured to operate in conjunction with the storage node 140. It is to be further noted that the storage control system 150 may include additional modules and other components that are typically included in various implementations of storage control systems (e.g., SDS systems), although such additional modules and other components are omitted for clarity and simplicity of illustration.

The compute nodes 110 illustratively comprise physical compute nodes and/or virtual compute nodes which host applications, process data and execute workloads. For example, the compute nodes 110 can include one or more server nodes (e.g., bare metal server nodes) and/or one or more virtual machines. In some embodiments, the compute nodes 110 comprise a cluster of physical server nodes or other types of computers of an enterprise computer system, cloud-based computing system or other arrangement of multiple compute nodes associated with respective users. In some embodiments, the compute nodes 110 include a cluster of virtual machines that execute on one or more physical server nodes.

The compute nodes 110 are configured to process data and execute tasks/workloads and perform computational work, either individually, or in a distributed manner, to thereby provide compute services such as execution of one or more applications on behalf of each of one or more users associated with respective ones of the compute nodes. The compute nodes 110 are configured to write data to and read data from the storage nodes 140 in accordance with applications executing on the compute nodes for system users. The compute nodes 110 illustratively issue IO requests that are processed by a corresponding one of the storage nodes 140. The term IO request as used herein refers to at least one of input and output. For example, an IO request may comprise a write request and/or a read request directed to stored data of a given one of the storage nodes 140 of the data storage system 130.

The compute nodes 110 communicate with the storage nodes 140 over the communications network 120. While the communications network 120 is generically depicted in FIG. 1A, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement IO channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising SDS systems, clustered or distributed virtual and/or physical infrastructure. The term "data storage system" as used herein should be broadly construed and not viewed as being limited to storage systems of any particular type or types. A storage system in some embodiments can be implemented using a combination of storage nodes and compute nodes. In some embodiments, the storage nodes 140 comprise storage server nodes (e.g., server node 400, shown in FIG. 4) having one or more processing devices each having a processor and a memory, possibly implementing virtual machines and/or containers, although numerous other configurations are possible. In some embodiments, one or more of the storage nodes 140 can additionally implement functionality of a compute node 110, and vice-versa. The term "storage node" as used herein is therefore intended to be broadly construed as a server node (e.g., a physical server machine) which comprises local persistent storage devices (e.g., storage devices 180) and which comprises a storage control system (e.g., storage control system 150, FIG. 1B) that is configured to manage and control access to the local persistence storage devices. A storage node may further comprise one or more compute nodes to process data and execute tasks/workloads.

In some embodiments, as schematically illustrated in FIG. 1B, the storage node 140 is a physical server node or storage appliance, wherein the data storage devices 180 comprise DAS resources (internal and/or external storage resources) such as hard-disk drives (HDDs), solid-state drives (SSDs), Flash memory cards, or other types of non-volatile memory (NVM) devices such non-volatile random access memory (NVRAM), phase-change RAM (PC-RAM) and magnetic RAM (MRAM). These and various combinations of multiple different types of storage devices 180 may be implemented in the storage node 140. In this regard, the term "storage device" as used herein is intended to be broadly construed, so as to encompass, for example, SSDs, HDDs, flash drives, hybrid drives or other types of storage media. The data storage devices 180 are coupled to the storage node 140 through any suitable host interface, e.g., a host bus adapter, using suitable protocols such as ATA, SATA, eSATA, NVMe, SCSI, SAS, etc. In other embodiments, the storage node 140 can be network connected to one or more NAS nodes over a local area network.

The storage control system 150 is configured to manage the storage devices 180 and control IO access to the storage devices 180 and/or other storage resources (e.g., DAS or NAS resources) that are directly attached or network-connected to the storage node 140. As noted above, in some embodiments, the storage control system 150 is implemented as part of an SDS system which supports the virtualization of the storage devices 180 by separating the control and management software from the underlying hardware architecture of the storage devices 180. The storage control system 150 runs on a server operating system of the storage node 140 to provide storage services. More specifically, in an SDS environment, the storage data server 160 is configured to abstract storage access services from the underlying storage hardware, and thereby control and manage IO requests issued by the compute nodes 110, as well as support networking and connectivity. In this instance, the storage control system 150 comprises a software layer that is hosted by the storage node 140 and deployed in the data path between the compute nodes 110 and the storage devices 180 of the storage node 140, wherein the storage control system 150 is configured to process IO requests from the compute nodes 110 by accessing the storage devices 180 to store/retrieve data to/from the storage devices 180 based on the IO requests.

In an SDS environment, the storage control system 150 comprises the storage data server 160 that is installed on each storage node that will contribute its storage to the data storage system. The storage control system 150 is configured to provision, orchestrate and manage the local storage resources (e.g., the storage devices 180) of the storage node 140. For example, the storage data server 160 implements methods that are configured to create and manage storage pools (e.g., virtual pools of block storage) by aggregating capacity from the storage devices 180. The storage data server 160 can divide a storage pool into one or more volumes and expose the volumes to the compute nodes 110 as virtual block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In the SDS environment, each of the storage nodes 140 in FIG. 1A can run an instance of the storage control system 150 to convert the respective local storage resources (e.g., DAS storage devices and/or NAS storage devices) of the storage nodes 140 into local block storage. Each instance of the storage data server 160 contributes some or all of its local block storage (HDDs, SSDs, PCIe, NVMe and flash cards) to an aggregated pool of storage of a storage server node cluster (e.g., cluster of storage nodes 140) to implement a server-based SAN (e.g., virtual SAN). In this configuration, each storage node 140 is part of a loosely coupled server cluster which enables "scale-out" of the SDS environment, wherein each instance of the storage data server 160 that runs on a respective one of the storage nodes 140 contributes its local storage space to an aggregated virtual pool of block storage with varying performance tiers (e.g., HDD, SSD, etc.) within a virtual SAN.

In some embodiments, in addition to the storage data servers 160 operating to create and expose volumes of a storage layer, the SDS environment comprises other components such as (i) data storage clients that consume the storage layer and (ii) metadata managers that coordinate the storage layer. More specifically, on the client-side (e.g., compute nodes 110), an SDS data storage client (SDC) component is a lightweight block device driver that is deployed on each node (e.g., server node) that consumes the shared block storage volumes that are exposed by the storage data servers 160 of the storage nodes 140. A given SDC component presents the volumes as block devices to the application(s) located on the server node on which the given SDC component is installed. The SDC component exposes block devices representing the virtual storage volumes that are currently mapped to that host. In particular, the SDC component serves as a block driver for a client (server), wherein the SDC component intercepts IO requests issued by a compute node 110, and utilizes the intercepted IO request to access the block storage that is managed by the storage control systems 150. The SDC component provides the operating system or hypervisor (which runs the SDC component) access to the logical block devices (e.g., volumes).

In the SDS environment, the primary data and copies of each storage volume are distributed over the storage nodes 140, and each SDC component has knowledge of which storage data server 160 holds its block data, so multipathing can be accomplished natively through the SDC components. In particular, each SDC component knows how to direct an IO request to the relevant destination SDS data server (e.g., storage control system 150). In this regard, there is no central point of routing, and each SDC component performs its own routing independent from any other SDC component. This implementation prevents unnecessary network traffic and redundant SDS resource usage. Each SDC component maintains peer-to-peer connections to the storage control systems 150 that manage the storage pool so each SDC component can communicate over multiple pathways to the storage nodes 140 which store the data. The multipoint peer-to-peer communication allows the SDC components to read and write data to and from all points simultaneously, eliminating bottlenecks and quickly routing around failed paths.

The management nodes 115 in FIG. 1A implement a management layer that is configured to manage and configure the storage environment of the system 100. In some embodiments, the management nodes 115 each comprise one or more SDS metadata manager (MDM) components, wherein the management nodes 115 comprise a tightly-coupled cluster of nodes that are configured to supervise the operations of the storage cluster and manage storage cluster configurations. The MDM components operate outside of the data path and provide the relevant information to the SDS clients and storage servers to allow such components to control data path operations. The MDM components are configured to manage the mapping of SDC components to the storage data servers 160. The MDM components manage various types of metadata that are required for system operation of the SDS environment such as configuration changes, managing the SDC components and data servers, device mapping, values, snapshots, system capacity including device allocations and/or release of capacity, RAID protection, recovery from errors and failures, and system rebuild tasks including rebalancing.

While FIG. 1A shows an exemplary embodiment of a two-layer deployment in which the compute nodes 110 are separate from the storage nodes 140 and connected by the communications network 120, in other embodiments, a converged infrastructure (e.g., hyperconverged infrastructure) can be implemented to consolidate the compute nodes 110, storage nodes 140, and communications network 120 together in an engineered system. For example, in a hyper-converged deployment, a single-layer deployment is implemented in which the storage data clients and storage data servers (e.g., storage control systems 150) run on the same nodes (e.g., each node deploys a storage data client and storage data servers) such that each node is a data storage consumer and a data storage supplier. In other embodiments, the system of FIG. 1A can be implemented with a combination of a single-layer and two-layer deployment.

Regardless of the specific implementation of the storage environment, as noted above, the various modules of the storage control system 150 of FIG. 1B collectively provide data storage and management methods that are configured to perform at least some of the following functions. In particular, the storage data server 160 may comprise the storage virtualization management module 162 which implements any suitable logical volume management (LVM) system that is configured to create and manage local storage volumes by aggregating the local storage devices 180 into one or more virtual storage pools that may be thin-provisioned for maximum capacity, and logically dividing each storage pool into one or more storage volumes that may be exposed as block devices (e.g., raw logical unit numbers (LUNs)) to the compute nodes 110 to store data. In some embodiments, the storage devices 180 are configured as block storage devices where raw volumes of storage are created and each block can be controlled as, e.g., an individual disk drive by the storage control system 150. Each block can be individually formatted with a same or different file system as required for the given data storage system application. The storage pools are primarily utilized to group storage devices based on device types and performance. For example, SSDs are grouped into SSD pools, and HDDs are grouped into HDD pools. Furthermore, in some embodiments, the data management services 164 implement methods to support various data storage management services such as data protection, data migration, data deduplication, thin provisioning, snapshots, data backups, etc.

The storage data replication system 170 implements various methods that are configured to support data replication operations. For example, the asynchronous replication control module 172 implements methods that are configured to support asynchronous data replication operations to replicate data of a primary (source) data volume 182, which is stored in the local data storage devices 180 of the source storage node 140, to a replica volume 182-D that is stored on local data storage devices of a destination storage node 140-D. It is to be understood that some or all of the storage nodes 140 of the data storage system 130 implement an instance of the storage data replication system 170, wherein a given storage data replication system 170 on a given storage node 140 can serve as (i) a source replication system (e.g., to replicate data of the local primary data volume 182 to a remote replica volume 182-D, as shown in FIG. 1B), and/or (ii) a destination replication system to store data in a local replica volume using a replication journal and associated data received from a source replication system.

It is to be noted that the term "replication consistency group" as used herein refers to a logical container for volumes whose application data need to be replicated with consistency. A replication consistency group contains volume pairs, which are pairs of volumes with a primary volume at a source node and a replica volume at a destination node, wherein the data of the primary volume is replicated to the replica volume. For example, in the exemplary embodiment of FIG. 1B, the primary data volume 182 and the replica volume 182-D comprise a volume pair.

The replication journal manager module 174 implements methods that are configured to generate and manage replication journals for asynchronous replication workloads that are processed by the storage data replication system 170. For example, a journal-based asynchronous replication system will buffer new writes to either cached or dedicated volumes, sometimes referred to as either journal volumes or write intent logs, before asynchronously transmitting the replication journals to destination nodes. The replication journal for a given replication workload is divided into data collection intervals, also referred to herein as journal barrier-intervals, journal barriers or just as barriers, by generating journal barriers at given points in time to enable consistency between the primary volume and replication volume.

More specifically, as IO write data is collected for a given replication workload over time, a journal barrier is created at a given point in time, and all IO write data that is collected up to the time of the journal barrier (and following a previously generated journal barrier) is transmitted to a replica (destination) system for synchronizing the journal data to the replica volume. In this regard, journal-based asynchronous replication enables the application of write sequence metadata so that when the contents of the journal volume are copied to the destination node, writes are committed to the replica volume in an order that maintains write order fidelity with the source volume.

In the source storage node 140, for replicated volumes, the compute nodes 110 (e.g., the SDC components that execute on the compute nodes 110) communicate with the storage data replication system 170. For non-replicated volumes, the compute nodes 110 communicate directly with the storage data server 160 as the storage devices 180 are managed by the storage data server 160. The storage data replication system 170 serves as a pipeline for IOs as application IOs (both reads and writes) intended for replication volumes are sent from a compute node 110 to the storage data replication system 170. The source storage data replication system 170 processes all IO requests associated with replication volumes and packages the IO write data into a consistent journal barrier and distills the write data (e.g., write-folding) so that only the most recent writes are included. The source storage data replication system 170 transmits the journal barrier for a given asynchronous replication workload to a target storage data replication system in the destination storage node 140-D. At the destination storage node 140-D, the target storage data replication system stores the replication journal 192-D and processes the replication journal barrier to update the replica volume 182-D.

At the source storage node 140, the replication journal manager module 174 implements methods that are configured to store the IO write data at the source node before it is sent to the destination node. At the destination, the journal stores the data before it is applied to the destination volumes. Once the IOs are sent to the destination journal and safely stored there, they are cleared from the source journal. Once the IOs are applied to the target volumes, they are cleared from the destination journal.

The manner in which IO data is stored in a replication journal will vary depending on the implementation. For example, in some embodiments, a copy of the IO write data is stored in a replication journal volume 184 in storage (e.g., HDD, or SSD storage) while replication journal metadata 192 is stored in the system memory 190. In this instance, the replication journal volume 184 comprises an actual copy of the data that was written to the primary data volume 182, while the replication journal metadata 192 would comprise information regarding the IO write transaction, including, but not limited to, one or more identifiers, a time stamp (denoting date and time at which the IO write transaction was received by source), a write size of the data block, a location (pointer) in the replication journal volume 184 where the actual IO write data is stored, a location in the replica volume 182-D where the data is to be written, etc. In some embodiments, the actual IO write data is stored in the system memory 190 in association with the journal metadata, in which case the replication journal metadata 192 would not include a pointer to the IO write data in the replication journal volume 184.

In some cases, the times at which journal barriers are generated for dividing the replication journal of a given replication workload into data collection intervals is related, at least in part, to the recovery point objective for the given replication workload. The recovery point objective is user-defined according to, e.g., service level agreements. For example, the data collection interval may be determined based at least in part on the recovery point objective and internal system conditions in a manner which enables compliance with the recovery point objective.

As an example, the data replication management module 117 may be configured to implement and manage data replication policies that describe different types of recovery, such as, e.g., disaster recovery, operational recovery, logical corruption recovery, etc. The objectives of the disaster recovery plans may be formulated in terms of attributes including, but not limited to, recovery point objectives (RPO) and recovery time objectives (RTO). In general, RPO refers to an acceptable amount of data loss measured in time relative to when a failure event or disaster occurs at the primary (source) system. More particularly, RPO denotes a maximum acceptable delay time between the time when data is committed at the primary site and the time when the data is committed to the replica (destination) system. The term RTO denotes the time to recover from a failure event or disaster.

For example, the time difference between a failure event at the primary system and a preceding replication event should not exceed the specified RPO for the replication system, otherwise the failure event would result in more data loss than what is acceptable under the specified RPO. The RPO value may be specified when configuring the replication system, and may be utilized to manage replication scheduling. An RPO can be specified in hours, minutes, or seconds, etc., depending on the given criticality of the application data, customer needs, etc. In another example, the time difference between a system recovery and a failure event should not exceed the specified RTO for recovery of the data storage system. For a particular system, an RTO can be specified in days, hours, minutes, or seconds, depending on, e.g., the application priority, business requirements, etc. For high priority applications, failover services can be implemented to enable RTO in seconds or any other amount of time.

As described above, scale-out storage systems achieve scalable performance by distributing the data and its associated processing across distributed components of the storage system such as, e.g., the compute nodes 110, storage nodes 140, management node(s) 115 or their SDC components, SDS components and MDM components. Replication data handling is also distributed, e.g., across SDS data replication (SDR) components of the compute nodes 110, to achieve scalable performance at both the replication source and replication destination.

The distribution of the data processing may change following events such as a failure of a system component or the addition or removal of a system component, e.g., a node, SDC component, SDR component, SDS component or any other component. In a scale-out storage system where capabilities may be scaled as needed based on demand or other factors, such changes in the distribution may occur often and in a manner that allows the system to function and serve IOs while handling the data distribution change in an effective manner. In some cases, the distribution of the data processing and handling between the components of the source and destination systems may also be asymmetric where, for example, each source component may collect and send data to many destination components or vice versa.

In a journal-based replication from a source system to a destination system, such as that described above, the replacement of the existing image with the new image comprises applying the data of the journal entries to the replication volume. The data of a consistent image can be efficiently applied with no need of coordination between the SDR components of the destination system because each SDR component of the destination system applies all of the journal entries to the blocks assigned to it by the distribution for the replication. Eventual arrival to a shared consistent image is guaranteed when all the destination SDR components apply all the consistent images.

To recover applications from the destination system the consistent image stored on the destination system has to represent an image of the data that may have existed on the source system at one time. To achieve this consistency, the write order fidelity of the IO operations needs to be preserved in the destination system. For example, if a user wrote IO A to address X before writing IO B to address X in the source volume, then IO B will be written after IO A to the destination volume or only IO B may be written to the destination volume since a write of IO A to the destination volume is not needed to preserve the write order fidelity in a case where a consistency point is at or after the write of IO B. This property is a necessary building block for achieving consistency between the source and destination systems.

In a distributed scale-out system such as that described above, replication layer (RL) components such as, e.g., the SDR components, are configured to send and apply the data independently without coordination or with minimal coordination by the MDM component. This functionality may be important in a scale-out system since extra coordination between the RL components may be resource expensive and can also slow down the replication speed. In a replication synchronization path, the MDM component coordinates when each journal barrier will be sent from the source system to the destination system by the SDR components of the source system in an order that will guarantee consistency.

A journal-based replication solution such as that described above holds the changes introduced by an application in the source journal barriers where each change comprises metadata, e.g., the address of this change in the volume, and user data for the change. In some cases, multiple non-atomic operations may be utilized as part of the replication process to replicate IO operations from the source system to the destination system. Because non-atomic operations are utilized, however, certain consideration may need to be given to the possibility of a failure occurring at any point in time between the non-atomic portion of the operations. However, even in a case where non-atomic operations are utilized, the replication solution still needs to guarantee that there is write order fidelity between the source system and the destination system.

As mentioned above, journal-based replication saves the changes, metadata and user data in the source system replication journal and asynchronously transmits the data from the replication journal to the destination system as each journal barrier is closed. Once that data is transmitted to the destination system and safely stored there, it may be deleted from the replication journal in the source system.

Independent of the specific implementation that is utilized, asynchronous replication must guarantee write order fidelity between the source system and the destination system. In one example scenario, a pair of storage objects, V and M, correspond to two volumes associated with an application. The application performs a write operation $W_m$ on the object M and a write operation $W_v$ on the object V. An example of such operations may comprise logging a transaction on object M and committing the transaction data to object V. To ensure crash consistency, the application must be sure to complete the write $W_m$, and to update the metadata, before proceeding with the write $W_v$. A replication solution must ensure that the replication on the destination system does not execute $W_v$ without the preceding $W_m$. Such a replication solution is said to honor write order fidelity with respect to objects V and M in this case. The destination system must at all times represent a state that could have existed on the source system for the objects being replicated at a specific point in time. However, for journal-based replication solution such as that described above, there may be additional considerations that need to be addressed to adhere to write order fidelity. For example, since the write to the source volume and the write to the replication journal are typically separate operations and therefore not atomic by default, any order that adheres to the write order fidelity may be utilized.

In illustrative embodiments, an example operation order will now be described that provides the ability to preserve write order fidelity during journal-based replication in the face of failures or crashes that may occur between the operations.

When an IO operation is received, metadata is saved in the replication journal before the user data is written to the user volume. By saving the metadata before the user data is written to the user volume, the replication process is ensured to have knowledge about the write even if a failure occurs right after the user data is written to the user volume but before any other replication actions may be taken. For example, absent the saving of the metadata first, a write may occur in the user volume but the process may crash preventing the metadata write to the replication journal. Such a crash would leave the replication solution with no knowledge of the change in the user volume and may result in the change never being replicated to the destination system.

After saving the metadata to the replication journal, the user data is written to the user volume on the source device followed by the user data being saved in the replication journal. It is important to write the user data to the user volume prior to storing the user data in the replication journal since in the event that the write to the user volume fails the user data should not be replicated to the destination system. For example, if the user data was stored in the replication journal prior to writing the user data to the user volume, the user data would be transmitted to the destination system for replication even if it was never actually written to the user volume on the source system due to a failure in the write.

Using this order of operations, i.e., write metadata to the replication journal, write user data to the user volume and write user data to the replication journal, a failure or crash that occurs between writing the metadata to the replication journal and the completion of the write of the user data to the replication journal can be recovered thereby preserving write order fidelity. The recovery is carried out when the replication solution attempts to transmit changes for which the metadata exists in the replication journal but the corresponding user data does not. In such a scenario, when missing user data is discovered, the relevant user data is instead read from the user volume in the source system. This ensures that whether the failure took place before or after the data was written to the underlying user volume of the source system, the destination system ends up with the same data as the source system after recovering from the failure. However, such a recovery may read user data from the user volume that is newer than the user data corresponding to the IO operation, which may or may not have been stored in the user volume depending on when the failure occurred.

Figure 2:
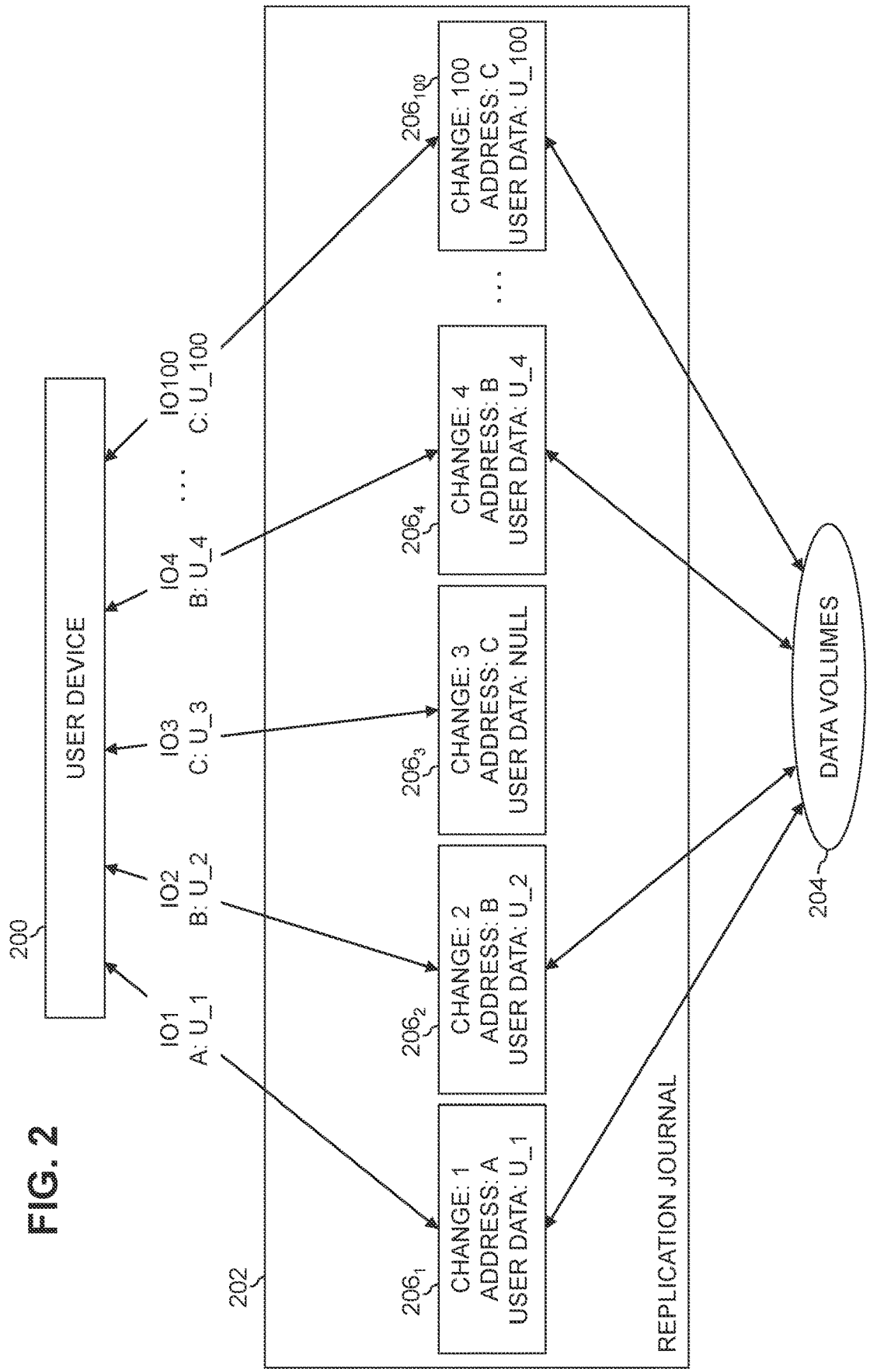
FIG. 2 illustrates an example scenario in which user data associated with a change is missing from the replication journal according to an exemplary embodiment of the disclosure.

With reference now to FIG. 2, an example scenario will now be described. As shown in FIG. 2, IO operations, e.g., IO1, IO2, IO3, IO4, . . . IO100 are obtained from a user device 200 in order. IO1 comprises user data U_1 which is to be stored in address A of data volumes 204, IO2 comprises user data U_2 which is to be stored in address B of data volumes 204, IO3 comprises user data U_3 which is to be stored in address C of data volumes 204, IO4 comprises user data U_4 which is to be stored in address B of data volumes 204, and IO100 comprises user data U_100 which is to be stored in address C of data volumes 204. In this example, the data volumes 204 refer to production or user data volumes of the source system.

In the example scenario of FIG. 2, the order in which the IO operations are obtained is as follows:

IO1 is obtained from the user device 200 after an acknowledgment is received for a prior IO operation that user data of the prior IO operation has been stored on the data volumes 204. The metadata corresponding to IO1 is stored in journal entry $206_1$ of the replication journal 202 as change 1. The user data U_1 is stored in address A of the data volumes 204 and the user data U_1 is then stored in the journal entry $206_1$.

IO2 is obtained from the user device 200 after an acknowledgment is received for IO1 that user data U_1 has been stored in address A on the data volumes 204. The metadata corresponding to IO2 is stored in journal entry $206_2$ of the replication journal 202 as change 2. The user data U_2 is stored in address B of the data volumes 204 and the user data U_2 is then stored in the journal entry $206_2$.

IO3 is obtained from the user device 200 after an acknowledgment is received for IO2 that user data U_2 has been stored in address B on the data volumes 204. The metadata corresponding to IO3 is stored in journal entry $206_3$ of the replication journal 202 as change 3.

The replication component fails before an acknowledgment for IO3 is received, leaving the source system in an uncertain state where it is not known whether or not U_3 is written to address C in the data volumes 204. The user data is also not stored in the journal entry $206_3$ due to the failure.

Next, the replication component recovers and continues obtaining IO operations.

IO4 is obtained from the user device 200. The metadata corresponding to IO4 is stored in journal entry $206_4$ of the replication journal 202 as change 4. The user data U_4 is stored in address B of the data volumes 204 and the user data U_4 is then stored in the journal entry $206_4$.

The process continues for each IO operation, e.g., IO5 through IO99 (not shown).

IO100 is obtained from the user device 200 after an acknowledgment is received for IO99 (not explicitly shown) that user data U_99 (not explicitly shown) has been stored in a corresponding address on the data volumes 204. The metadata corresponding to IO100 is stored in journal entry $206_{100}$ of the replication journal 202 as change 100. The user data U_100 is stored in address C of the data volumes 204 and the user data U_100 is then stored in the journal entry $206_{110}$.

As seen in FIG. 2, there is a causality between IO100 and IO4 since IO100 was sent as a result of an acknowledgment for IO4, e.g., since the succeeding IO operations are obtained after the acknowledgment of IO4. Because of this, a user expects that if user data U_100 is written in address C in the destination system then it is not possible that address B comprises user data U_2 since IO4 was acknowledged to have written user data U_4 to address B. For example, if the destination system applies user data U_100 to address C before applying user data U_4 to address B then the data in the destination system will be inconsistent with regard to write order fidelity for the source system, e.g., until user data U_4 is applied to address B.

Even if the destination system applies the changes in order, the inconsistency problem still remains as long as failures are recovered for replication by reading the data from the user volume, e.g., in the manner described above. For example, due to the asynchronous nature of the replication it is possible that the source system will transmit change 3 as part of the recovery after user data U_100 is already written to the user volume. In such a case, since the replication journal 202 does not contain user data for change 3, the contents of address C will be read from the data volumes 204. Since address C contains user data U_100, the recovery of change 3 will attempt to write user data U_100 to the destination system as if it were part of change 3. Because user data U_100 is being written for change 3, even if the destination system applies the changes in order, e.g., applies all changes up to and including change 3 in order, the destination system will comprise user data U_1 in address A, user data U_2 in address B and user data U_100 in address C. This means that even after applying the IO operations up to change 3 as recovered, the destination system is inconsistent and does not resemble a state that could have existed at the source system with respect to addresses B and C.

When the asynchronous replication is a scale-out solution, additional considerations may be needed. For example, in a scale-out solution the requirement to transmit and apply the replication journal in order means that both the transmit step and the apply step are carried out at the speed of the slowest components. For a high-performance, scale-out system, the performance impact of slowing down the asynchronous replication throughput to the slowest component may significantly impact the performance of the replication and the system as a whole.

These considerations and potential inconsistencies may be taken into account in illustrative embodiments by maintaining information about an order of the portions of the replication journal that are transmitted by replication components in the source system, sometimes referred to herein as SDS data replication components (SDR components), to corresponding SDR components in the destination system. In illustrative embodiments, the information about the order is generated and managed without the need for lock-step progress between the SDR components of either the source system or the destination system.

In one example scenario, a simplified explanation of an illustrative embodiment will now be presented with continued reference to FIG. 2. In this simplified explanation, there is only one SDR component in the source system and one SDR component in the destination system. Each change in source system is assigned an order number, e.g., change 1, change 2, etc., where the changes are applied in the destination system according to their order number. For example, when there is a change C_i for which the user data has not been saved in the replication journal 202, e.g., change 3 in the example of FIG. 2, the replication functionality will logically disqualify consistency for the range of changes [C_i, C_latest], where C_latest corresponds to the last change that was added to the replication journal at the time that the data for recovering change C_i was read from the user volume prior to the transmission of the change C_i to the destination system. This range may also be referred to as the IC interval. The replication functionality is configured to report the IC interval to the SDR component in the destination system prior to transmitting the corresponding change C_i. The SDR component in the destination system maintains a unified IC interval which comprises any IC intervals received from SDR components of the source system. Once the SDR component of the destination system receives a change with an order outside of the unified IC interval, the SDR component will know that after applying this change, the replication data is consistent.

For example, with reference again to the example of FIG. 2, the metadata associated with IO3 is added to the replication journal 202 in journal entry $206_3$ with an order of change 3 but the user data U_3 does not get added to the journal entry $206_3$, e.g., due to a failure. In this case, when change 3 is recovered, e.g., whatever user data is at address C is obtained from the data volumes 204 for replication as part of change 3, the replication functionality determines that change 100 is the latest change. An IC interval of [change 3, change 100] is then provided to the destination system SDR component to indicate that all changes between change 3 and change 100 are logically disqualified from being considered consistent.

The user data and metadata for change 3 is then submitted to the SDR component of the destination system and processed as normal. Once the SDR component of the destination system receives a change that is outside of the order, e.g., a change IO1, the destination system will once again be considered consistent. For example, even if the user data that was obtained from the data volumes 204 and transmitted along with the recovered change 3 was actually user data from change 100, e.g., user data U_100, because the changes are made in order, a completion of change 100 would result in that user data U_100 being consistent again regardless of the user data U_3 that was originally supposed to be transmitted along with change 3 absent the failure. Since by change 100, i.e., the end of the IC interval, the user data U_100 for address C is consistent, any change after the end of the IC interval will be consistent absent another failure.

While the above example describes replication functionality for a single SDR component in each of the source system and destination system that handles inconsistencies that are introduced by a failure in the replication either before or after user data is written to an address in the data volumes 204 but before the user data is also written to the replication journal 202, some additional considerations may still need to be addressed in some systems.

For example, in a source system where multiple distributed, independent and asynchronous SDR components are utilized, such an ordering of IO changes according to their arrival may not be available. In addition, the introduction of an extra transmission for the IC interval from the SDR component of the source system to the SDR component of the destination system each time there is a change with unsaved user data may cause potential inefficiencies in the system.

In illustrative embodiments, replication functionality is disclosed that provides an order number to a group of IO operations which were received in the source system inside a well-defined time interval such as, e.g., the journal barriers described above. In one example, each journal barrier may be assigned a journal barrier identifier (ID) which may be utilized as the order number for any IO operations that are stored in that journal barrier. Each new journal barrier may be assigned a journal barrier ID that is later than a previous journal barrier ID where, for example, being later may comprise having a larger value, a smaller value, or any other value that is different than the value of the previous journal barrier ID and may be utilized to determine that the new journal barrier came later in time than the previous journal barrier.

The disclosed replication functionality for each SDR component may handle inconsistency reporting in a similar manner to that described above except that instead of using an order number for each of the changes, the journal barrier ID is utilized for any changes included in that journal barrier where the IC interval comprises a range of journal barrier IDs that need to be handled before a consistent state may be reached, for example, in a similar manner to that described above for the IC interval of the change orders.

The disclosed replication functionality ensures that different IO operations to the same address in the same journal barrier are provided to the same SDR component in the source system and may, prior to transmitting a journal barrier, remove all IO operations to the same address except for the latest IO operation. The disclosed replication functionality also ensures that if a given IO operation was obtained after an acknowledgment of another IO operation, then the other IO operation will be stored in a journal barrier having an earlier or equal journal barrier ID to the journal barrier ID of the journal barrier in which the given IO operation is stored. The disclosed replication functionality also ensures that the destination system will apply the journal barriers in each SDR component according to the order of the journal barrier IDs, where the MDM component of the destination system instructs the SDR components about which journal barrier is the latest journal barrier to be applied before consistency may be reached. Once the latest journal barrier identified by the MDM component has been applied, the destination system will have reached consistency with the source system.

In order to apply the above functionality, the MDM component is configured to assign the journal barrier ID to the journal barrier in association with the closing of the current journal barrier, e.g., based on the RPO, RTO or any other criteria. For example, in some embodiments, the journal barrier ID is assigned to a journal barrier in conjunction with the closing of the journal barrier and the journal barrier ID is sent to the SDR component. Similarly, the new journal barrier that has been opened will be assigned its own journal barrier ID when it is closed where the journal barrier ID for the new journal barrier will have a value that indicates that it is later than the journal barrier ID of the closed journal barrier. The MDM component provides an indication to the SDR components of the source system that the new barrier has been opened and the current barrier has been closed, e.g., by sending the SDR components of the source system the journal barrier ID of the closed journal barrier. Each new change that is added to the replication journal for a given SDR component is added to the new open barrier in a way that it will be associated with the journal barrier ID of that journal barrier when it is later closed by the MDM component and the journal barrier ID is received from the MDM component by the given SDR component. While journal barrier IDs are described herein as being assigned on the closing of a journal barrier, in other embodiments, the journal barrier ID may be assigned to a journal barrier at any time including, e.g., at the time that the journal barrier is opened, between the time that the journal barrier is opened and the journal barrier is closed, at the time that the journal barrier is closed as described above, after the journal barrier is closed or at any other time. In some embodiments, the journal barrier ID that will be assigned to the open journal barrier at closing may be known in advance and utilized by the MDM component or SDR components as needed.

The replication functionality ensures that if a user executed a given IO operation after an acknowledgment of another IO operation was returned, then the change created for the given IO operation will be assigned a journal barrier ID that is not earlier than the journal barrier ID that is assigned to the other IO operation. For example, either the given IO operation is in the same journal barrier as the other IO operation, i.e., will have the same journal barrier ID upon closing of the journal barrier, or the given IO operation is in a journal barrier that is later in time than the other IO operation, i.e., will have a later journal barrier ID.

For example, such functionality may be accomplished by the MDM component notifying all of the SDR components of the source system about the closing of the old journal barrier and the opening of the new journal barrier where the SDR components will enter incoming IO operations into the new journal barrier. However, during the transition between journal barriers, the incoming IO operations will not be acknowledged. When the MDM component receives an indication from all of the SDR components that the new journal barrier has been opened, the MDM component instructs the SDR components to begin acknowledging incoming IO operations. Any IO operations that were received between the notification to close the old journal barrier and the instruction to begin acknowledging the incoming IO operations will not return acknowledgments.

The replication functionality also ensures that two different writes to the same address that have the same journal barrier ID will arrive at the same source system SDR component and write folding will be employed such that only the latest change to the address in a given journal barrier will be replicated to the destination system.

As part of the replication functionality, each SDR component of the source device is configured to report a journal barrier IC interval to the MDM component in the event that user data is missing in the journal entries for one or more changes included in a corresponding journal barrier. For example, for each change $C\_i$ for which the user data is missing in a journal entry of the replication journal, the corresponding SDR component is configured to perform at least some of the following actions in an illustrative embodiment.

Since the missing user data will be obtained from the address of the data volumes 204 that corresponds to the change $C\_i$, the SDR component is configured to cause the corresponding data volumes 204 to abort any IO operations that are in progress for the corresponding address, e.g., by using an IO abort command.

The SDR component is also configured to read the user data from the corresponding address of the data volumes 204 and to store the address as part of the journal entry corresponding to the change $C\_i$ of the replication journal as part of the journal barrier. As mentioned above, in some circumstances, the user data stored in the address may actually be data from a later change that occurred after change $C\_i$. For example, after the journal barrier is closed, a new journal barrier is opened and begins receiving new IO operations. In some cases, before a closed barrier is processed for transmission, other changes for the corresponding address on the data volumes 204 may be received and multiple other journal barriers may be closed in order such that the user data stored in the address may change multiple times.

When the journal barrier is closed and processed for transmission, if there is any missing data the SDR component reports a journal barrier IC interval, e.g., [the journal barrier ID of the journal barrier comprising change $C\_i$ for which user data is missing, the journal barrier ID that will be assigned to the current open journal barrier], to the MDM component as the inconsistent interval created due to the missing data for this change $C\_i$. The SDR component then transmits its portion of the closed journal barrier to the destination system.

The MDM component unifies or aggregates any journal barrier IC intervals that are received from the SDR components for a given journal barrier that was closed. For example, if more than one SDR component had a change with missing data for the same journal barrier, a unified or aggregated global IC interval may be created that corresponds to an interval between the closed barrier and the current open journal barrier that is considered inconsistent for any of the changes, e.g., as described above.

Once the SDR component finishes transmitting the changes found in its portion of the closed journal barrier to the destination system, the SDR component notifies the MDM component that its portion of the journal barrier transmission has been completed.

Once all the SDR components have notified the MDM component that they have finished transmitting their respective portions of the journal barrier, the MDM component marks the journal barrier as fully transmitted and notifies the MDM component of the destination system of the fully completed transmission. The MDM component of the source system may also provide the MDM component of the destination system with the unified journal barrier IC interval for the fully transmitted journal barrier. This process continues as each journal barrier is closed and transmitted.

For each fully transmitted journal barrier, the destination MDM component of the destination system determines whether or not the fully transmitted journal barrier is outside of the unified or aggregated journal barrier IC interval, e.g., is later than the latest journal barrier in the journal barrier IC interval which was the current open barrier at the time the journal barrier IC interval was created. If the fully transmitted journal barrier is outside of the unified or aggregated IC interval, then the journal barrier is considered consistent. Each SDR component of the destination system applies its portion of the journal barriers in order without requiring synchronization with the other SDR components of the destination system. When the SDR components of the destination system apply a journal barrier that is outside of any journal barrier IC interval, the destination system determines that a consistent point has been reached which may be revealed to and utilized by the user for backup recovery or other purposes.

With reference now to FIG. 3, an example process for handling journal barriers having changes with missing user data according to illustrative embodiments will now be described.

At step 300, an IO operation corresponding to an address of the source system is obtained, e.g., from a client device. The IO operation comprises first user data.

At step 302, metadata associated with the IO operation is stored in a first journal barrier of a replication journal of the source system.

At step 304, the first journal barrier is closed, e.g., the MDM component instructs the SDR components to close the currently open journal barrier.

At step 306, the first user data associated with the IO operation is determined to be missing from the first journal barrier. For example, the SDR component sees that the value of the journal entry does not comprise user data, i.e., is null or has another value that does not correspond to user data.

At step 308, second user data is obtained from the address by the SDR component. For example, it is not known whether the first data was ever stored to the user data. In addition, it is not known if later IO operations wrote data to the same address. In other words, the second user data may comprise the first user data, be different than the first user data, or comprise only a portion of the first user data.

At step 310, an interval from the first journal barrier to a second journal barrier is identified by the SDR component. For example, the second journal barrier may comprise the current open journal barrier at the time that the closed journal barrier is being processed in some embodiments.

At step 312, the first journal barrier and the interval are provided to a destination system, e.g., by the MDM component of the source system.

At step 314, the destination system determines, for each successive journal barrier after the first journal barrier that is closed and transmitted to the destination system, whether or not the successive journal barrier is outside of the interval. Responsive to determining that the successive journal barrier is outside of the interval, the destination system indicates that the successive journal barrier is consistent with the source system.

FIG. 4 schematically illustrates a framework of a server node 400 for implementing a storage node (e.g., storage node 140, FIGS. 1A and 1B) according to an exemplary embodiment of the disclosure. The server node 400 comprises processors 402, storage interface circuitry 404, network interface circuitry 406, virtualization resources 408, system memory 410, and storage resources 416. The system memory 410 comprises volatile memory 412 and non-volatile memory 414. The processors 402 comprise one or more types of hardware processors that are configured to process program instructions and data to execute a native operating system (OS) and applications that run on the server node 400.

For example, the processors 402 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 404 enables the processors 402 to interface and communicate with the system memory 410, the storage resources 416, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 406 enables the server node 400 to interface and communicate with a network and other system components. The network interface circuitry 406 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, IO adaptors, converged Ethernet adaptors, etc.) to support communication protocols and interfaces including, but not limited to, PCIe, DMA and RDMA data transfer protocols, etc.

The virtualization resources 408 can be instantiated to execute one or more service or functions which are hosted by the server node 400. For example, the virtualization resources 408 can be configured to implement the various modules and functionalities of the storage control system 150 (FIG. 1B) as discussed herein. In one embodiment, the virtualization resources 408 comprise virtual machines that are implemented using a hypervisor platform which executes on the server node 400, wherein one or more virtual machines can be instantiated to execute functions of the server node 400. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 400, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 408 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 400 as well execute one or more of the various modules and functionalities of the storage control system 150 as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various components of the storage control systems, source systems and destination systems comprise program code that is loaded into the system memory 410 (e.g., volatile memory 412), and executed by the processors 402 to perform respective functions as described herein. In this regard, the system memory 410, the storage resources 416, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 410 comprises various types of memory such as volatile RAM, NVRAM, or other types of memory, in any combination. The volatile memory 412 may be a dynamic random-access memory (DRAM) (e.g., DRAM DIMM (Dual In-line Memory Module), or other forms of volatile RAM. The non-volatile memory 414 may comprise one or more of NAND Flash storage devices, SSD devices, or other types of next generation non-volatile memory (NGNVM) devices. The system memory 410 can be implemented using a hierarchical memory tier structure wherein the volatile memory 412 is configured as the highest-level memory tier, and the non-volatile memory 414 (and other additional non-volatile memory devices which comprise storage-class memory) is configured as a lower level memory tier which is utilized as a high-speed load/store non-volatile memory device on a processor memory bus (i.e., data is accessed with loads and stores, instead of with IO reads and writes). The term "memory" or "system memory" as used herein refers to volatile and/or non-volatile memory which is utilized to store application program instructions that are read and processed by the processors 402 to execute a native operating system and one or more applications or processes hosted by the server node 400, and to temporarily store data that is utilized and/or generated by the native OS and application programs and processes running on the server node 400. The storage resources 416 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to implement a first storage node of a plurality of storage nodes of a distributed storage system;
to maintain a source replication journal in the first storage node, the source replication journal storing user data and metadata for each of at least a subset of a plurality of input-output operations targeting at least portions of one or more logical storage volumes subject to asynchronous replication from the first storage node to at least a second storage node of the plurality of storage nodes, the second storage node maintaining a destination replication journal for the asynchronous replication, the source replication journal comprising a first entry that includes metadata but no user data for a first one of the input-output operations targeting a given address and a second entry that includes both user data and metadata for a second one of the input-output operations also targeting the given address;
to associate a group of multiple ones of the input-output operations, each such input-output operation in the group having been received by the first storage node within a designated time interval, with a corresponding barrier identifier that is determined based at least in part on an ordering of the input-output operations within the group, the barrier identifier thereby identifying the group of multiple input-output operations each received within the designated time interval, wherein the group comprises at least the first input-output operation for which the first entry of the source replication journal includes the metadata and no user data, the second input-output operation for which the second entry of the source replication journal includes both user data and metadata, and one or more additional input-output operations received by the first storage node between receipt of the first input-output operation and receipt of the second input-output operation; and
to send the barrier identifier, and a corresponding portion of the source replication journal including at least the first entry and the second entry, from the first storage node to the second storage node as part of the asynchronous replication;
wherein the second storage node utilizes the barrier identifier received from the first storage node to control application of changes to respective replicated versions of the one or more logical storage volumes.

2. The apparatus of claim 1 wherein the distributed storage system comprises a software-defined storage system.

3. The apparatus of claim 1 wherein the at least one processing device is further configured to communicate with one or more data storage clients implemented on at least one compute node.

4. The apparatus of claim 3 wherein the plurality of input-output operations are generated by at least one application executing on the at least one compute node.

5. The apparatus of claim 3 wherein the at least one compute node is configured to communicate with the plurality of storage nodes of the distributed storage system over at least one network.

6. The apparatus of claim 1 wherein the at least one processing device is further configured, for a given one of the input-output operations, to save the corresponding metadata to the source replication journal, to write the user data to a targeted portion of the logical storage volume, and to save the user data to the source replication journal after the write of the user data to the targeted portion of the logical storage volume.

7. The apparatus of claim 1 wherein the at least one processing device is further configured to associate a plurality of groups of different ones of the input-output operations received by the first storage node within respective different time intervals with respective different corresponding barrier identifiers each determined based at least in part on an ordering of the input-output operations within that group.

8. The apparatus of claim 7 wherein each of the barrier identifiers uniquely characterizes the ordering of the particular input-output operations within its corresponding group, in a manner detectable by the second storage node.

9. The apparatus of claim 1 wherein the at least one processing device is further configured, for a given one of the input-output operations obtained after receipt of an acknowledgement for a previous one of the input-output operations, to assign the given input-output operation to a group having a barrier identifier that is later than or equal in time to a barrier identifier of the group to which the previous input-output identifier is assigned.

10. The apparatus of claim 1 wherein the second storage node utilizes the barrier identifier received from the first storage node to control application of changes to respective replicated versions of the one or more logical storage volumes by applying any such changes in accordance with a sequence of received journal barrier identifiers.

11. The apparatus of claim 10 wherein the second storage node at a given point in time applies only those changes associated with a currently latest one of the journal barrier identifiers in the sequence of received journal barrier identifiers.

12. The apparatus of claim 1 wherein the barrier identifier is assigned to the group of input-output operations in conjunction with closing of a corresponding barrier of the source replication journal.

13. A computer program product comprising a non-transitory processor-readable storage medium having stored therein program code of one or more software programs, wherein the program code when executed by at least one processing device comprising a processor coupled to a memory, causes the at least one processing device:
to implement a first storage node of a plurality of storage nodes of a distributed storage system;
to maintain a source replication journal in the first storage node, the source replication journal storing user data and metadata for each of at least a subset of a plurality of input-output operations targeting at least portions of one or more logical storage volumes subject to asynchronous replication from the first storage node to at least a second storage node of the plurality of storage nodes, the second storage node maintaining a destination replication journal for the asynchronous replication, the source replication journal comprising a first entry that includes metadata but no user data for a first one of the input-output operations targeting a given address and a second entry that includes both user data and metadata for a second one of the input-output operations also targeting the given address;
to associate a group of multiple ones of the input-output operations, each such input-output operation in the group having been received by the first storage node within a designated time interval, with a corresponding barrier identifier that is determined based at least in part on an ordering of the input-output operations within the group, the barrier identifier thereby identifying the group of multiple input-output operations each received within the designated time interval, wherein the group comprises at least the first input-output operation for which the first entry of the source replication journal includes the metadata and no user data, the second input-output operation for which the second entry of the source replication journal includes both user data and metadata, and one or more additional input-output operations received by the first storage node between receipt of the first input-output operation and receipt of the second input-output operation; and to send the barrier identifier, and a corresponding portion of the source replication journal including at least the first entry and the second entry, from the first storage node to the second storage node as part of the asynchronous replication;

wherein the second storage node utilizes the barrier identifier received from the first storage node to control application of changes to respective replicated versions of the one or more logical storage volumes.

14. The computer program product of claim 13 wherein the program code when executed further causes the at least one processing device, for a given one of the input-output operations, to save the corresponding metadata to the source replication journal, to write the user data to a targeted portion of the logical storage volume, and to save the user data to the source replication journal after the write of the user data to the targeted portion of the logical storage volume.

15. The computer program product of claim 13 wherein the program code when executed further causes the at least one processing device to associate a plurality of groups of different ones of the input-output operations received by the first storage node within respective different time intervals with respective different corresponding barrier identifiers each determined based at least in part on an ordering of the input-output operations within that group.

16. The computer program product of claim 15 wherein each of the barrier identifiers uniquely characterizes the ordering of the particular input-output operations within its corresponding group, in a manner detectable by the second storage node.

17. A method comprising:

implementing a first storage node of a plurality of storage nodes of a distributed storage system;

maintaining a source replication journal in the first storage node, the source replication journal storing user data and metadata for each of at least a subset of a plurality of input-output operations targeting at least portions of one or more logical storage volumes subject to asynchronous replication from the first storage node to at least a second storage node of the plurality of storage nodes, the second storage node maintaining a destination replication journal for the asynchronous replication, the source replication journal comprising a first entry that includes metadata but no user data for a first one of the input-output operations targeting a given address and a second entry that includes both user data and metadata for a second one of the input-output operations also targeting the given address;

associating a group of multiple ones of the input-output operations, each such input-output operation in the group having been received by the first storage node within a designated time interval, with a corresponding barrier identifier that is determined based at least in part on an ordering of the input-output operations within the group, the barrier identifier thereby identifying the group of multiple input-output operations each received within the designated time interval, wherein the group comprises at least the first input-output operation for which the first entry of the source replication journal includes the metadata and no user data, the second input-output operation for which the second entry of the source replication journal includes both user data and metadata, and one or more additional input-output operations received by the first storage node between receipt of the first input-output operation and receipt of the second input-output operation; and sending the barrier identifier, and a corresponding portion of the source replication journal including at least the first entry and the second entry, from the first storage node to the second storage node as part of the asynchronous replication;

wherein the second storage node utilizes the barrier identifier received from the first storage node to control application of changes to respective replicated versions of the one or more logical storage volumes; and wherein the method is performed by at least one processing device comprising a processor coupled to a memory.

18. The method of claim 17 wherein the method further comprises, for a given one of the input-output operations, saving the corresponding metadata to the source replication journal, writing the user data to a targeted portion of the logical storage volume, and saving the user data to the source replication journal after the write of the user data to the targeted portion of the logical storage volume.

19. The method of claim 17 further comprising associating a plurality of groups of different ones of the input-output operations received by the first storage node within respective different time intervals with respective different corresponding barrier identifiers each determined based at least in part on an ordering of the input-output operations within that group.

20. The method of claim 19 wherein each of the barrier identifiers uniquely characterizes the ordering of the particular input-output operations within its corresponding group, in a manner detectable by the second storage node.

* * * * *